United States Patent [19]

Cornell

[11] 4,151,136

[45] Apr. 24, 1979

[54] ACID REACTABLE INORGANIC MINERAL FILLERS HAVING IMPROVED COMPATIBILITY WITH POLYOLEFIN RESINS

[75] Inventor: Stephen W. Cornell, Naperville, Ill.

[73] Assignee: The Continental Group, Inc., New York, N.Y.

[21] Appl. No.: 887,102

[22] Filed: Mar. 16, 1978

[51] Int. Cl.$^2$ .......................... C08J 5/06; C08K 9/04
[52] U.S. Cl. .......................... 260/23 H; 260/23 EM; 260/23 CP; 260/42.14; 260/42.53; 260/DIG. 37
[58] Field of Search .................. 260/DIG. 37, 23 CP, 260/23 EM, 42.14, 42.53, 23 H

[56] References Cited

U.S. PATENT DOCUMENTS

| | | | |
|---|---|---|---|
| 3,084,117 | 4/1963 | Nahin et al. | 204/158 |
| 3,272,772 | 9/1966 | Russell | 260/42.53 |
| 3,463,350 | 8/1969 | Unger | 220/83 |
| 3,519,593 | 7/1970 | Bolger | 260/42.14 |
| 3,668,038 | 6/1972 | Kirk et al. | 156/276 |
| 3,803,065 | 4/1974 | Arai et al. | 260/42.14 |
| 3,923,190 | 12/1975 | Roth | 220/67 |

FOREIGN PATENT DOCUMENTS

| | | | |
|---|---|---|---|
| 48-31747 | 10/1973 | Japan | 260/42.14 |
| 905069 | 9/1962 | United Kingdom | 260/42.14 |

*Primary Examiner*—Ronald W. Griffin
*Attorney, Agent, or Firm*—Paul Shapiro; Joseph E. Kerwin; William A. Dittmann

[57] ABSTRACT

Mineral fillers reactable with acids such as metal carbonates such as $CaCO_3$ are rendered more compatible with polyolefin resins such as polyethylene by first reacting the filler with a long chain carboxylic acid to form a surface film of the acid. The acid reacted filler is contacted with a vinyl ester of the acid which is then polymerized in the presence of a free radical catalyst such as benzoyl peroxide to encapsulate the acid reacted filler in a coating of the polymerized ester.

6 Claims, No Drawings

ACID REACTABLE INORGANIC MINERAL FILLERS HAVING IMPROVED COMPATIBILITY WITH POLYOLEFIN RESINS

BACKGROUND OF THE INVENTION

1. Field of the Invention

This invention relates to the compatibilization of fillers with polyolefin resins. More particularly, this invention relates to a method for rendering acid reactable inorganic mineral fillers more compatible with polyethylene resins to improve the physical properties of the resins.

2. The Prior Art

In the manufacture of canned foodstuffs, the containers, usually metal cans, are filled with the foodstuff, covered with a metal end closure and sealed. One of the disadvantages of canning foodstuffs in metal containers is that the presence of the food product may cause the interior of the can to corrode, the corrosion products of which contaminate the food product.

Attempts to substitute certain inert synthetic resin materials such as polyethylene for metal in the canning of foodstuffs have encountered the disadvantage that the sidewalls of containers fabricated from such resins generally do not have acceptable stiffness and rigidity to withstand buckling from loading stresses encountered when the containers are stacked during storage.

The art has devised a number of ways to increase the stiffness of polyethylene and other polyolefin resins. Included in these methods is to incorporate in the polyolefin resin a filler material such as wood flour and inorganic mineral fillers such as metal carbonates, clay or mica, e.g., U.S. Pat. No. 3,463,350, Br. No. 905,069 and U.S. Pat. No. 3,668,038.

Containers molded from filled polyolefin resins generally have poor impact strength and crack when dropped from relatively low (e.g., 2 feet or less) heights.

The poor impact properties of the container sidewalls are believed due to the poor compatibility of the fillers and the polyolefin matrix.

Various means are known to the art for improving the compatibility of fillers with polyolefin resins which involve modification of the filler surface. For example, British Patent No. 905,069 teaches that polyethylene resins filled with fatty acid coated metal carbonates exhibit improved stress cracking resistance when compared with polyethylene filled with uncoated metal carbonates. U.S. Pat. No. 3,084,117 teaches improving the compatibility of clays by base-exchanging clay particles with an unsaturated organic nitrogen compound to form an organoclay adduct which is admixed with a polyolefin resin and the admixture subjected to high energy ionizing radiation to cross-link the unsaturated nitrogen compound.

The prior art methods discussed above either do not provide the improvement demanded in container applications of the polyolefin resin or the compatibilization technique deleteriously induces undesirable physical properties in the resin otherwise acceptable.

SUMMARY OF THE INVENTION

In accordance with the present invention, there is provided a method for preparing acid reactable inorganic mineral fillers having improved compatibility with polyolefin resins wherein a long chain carboxylic acid having 8 to 22 carbon atoms is reacted with the filler particles to form a salt of the acid at the surface of the filler particles. The acid reacted filler is then contacted with a vinyl ester of the long chain carboxylic acid. Thereafter, the vinyl ester monomer is polymerized to provide a cross-linked sheath encapsulating the acid reacted filler.

Acid reactable inorganic mineral fillers subjected to the sequential treatment just described are found to be more readily dispersed in polyolefin matrices with the result that the filled polyolefin resin exhibits improved physical properties such as impact resistance in excess over that heretofore achieved by the prior art.

PREFERRED EMBODIMENTS

The term "polyolefin" includes within its meaning olefin polymers, such as polyethylene, polypropylene, poly-1-butene, poly-4-methyl-pentene-1 and other homopolymers and copolymers of similar mono-1-olefins having up to 8 carbon atoms per molecule. Of these, high density (0.950–0.968) polyethylene is preferred.

In preparing polyolefin filled compositions in accordance with the practice of the present invention, the polyolefin resin, desirably in the form of a powder having a particle size of 5 to 100 microns and preferably 10 to 30 microns, is admixed with the acid-ester modified mineral filler in blends containing about 10 to about 70% by weight of the polyolefin and about 30 to about 90% by weight of the filler and preferably about 35 to about 60% by weight of the polyolefin and about 40 to about 65% by weight of the filler.

The filler blended with the polyolefin is also advantageously in micron sized powder form, the filler particles having a median diameter which varies from 0.1 to 30 microns and preferably from 0.5 to 15 microns.

For many use applications, and particularly food container manufacture, the presence of a third material component which will lower the gas permeability of the polyolefin is desirably included in the filled polyolefin compositions. Such materials include clay-like materials having a platelike or platelet structure such as mica as well as thermoplastic resins such as nylon, acrylonitrile polymers and saran polymers. Saran polymers are vinylidene chloride polymers including vinylidene chloride homopolymers and copolymers of vinylidene chloride containing between 70 and 98 percent by weight polymerized vinylidene chloride with the remainder being a monoethylenically unsaturated monomer which is copolymerizable with vinylidene chloride as, for example, vinyl chloride, acrylonitrile, acrylic or methacrylic acid and their ester derivatives. When these third components are included in the polyolefin compositions, the mixture of materials in the polyolefin composition includes about 30 to about 70% by weight of the polyolefin resin, about 30 to about 75% by weight of the acid-ester coated filler and 0 to about 30% by weight of the third component.

Acid reactable inorganic mineral fillers which may be treated in accordance with the practice of the present invention include the metal carbonate salts of Group 2 of the Periodic Table such as the magnesium, barium and calcium carbonates.

Long chain carboxylic acids which may first be reacted with the acid reactable inorganic mineral fillers in accordance with the process of the present invention include saturated and olefinic unsaturated aliphatic acids having 8 or more carbon atoms and preferably 12 to 22 carbon atoms such as fatty acids as capric acid, lauric acid, myristic acid, palmitic acid, isostearic acid, stearic acid and arachidic acid, undecylemic acid, myristoleic acid, oleic acid, cetoleic acid and erucic acid and mixtures of these acids.

Contact of the acid reactable filler with the long chain carboxylic acid is believed to result in a chemical reaction between the acid and the filler to form a chemical bond between the filler surface and the acid.

Vinyl esters which may be used to coat the carboxylic acid reacted filler include the vinyl esters of long chain carboxylic esters of the same type used for reaction with the filler such as vinyl laurate, vinyl palmitate, vinyl stearate, vinyl oleate and mixtures thereof.

Preferably the vinyl ester used to coat the acid reacted filler has the same acid moiety as the acid used originally to react with the filler.

In preparing mineral fillers for incorportion in polyethylene it is preferred that stearic acid be used as the acid reactant as this acid possesses a hydrocarbon chain similar in structure to polyethylene.

The long chain carboxylic acid is applied to mineral filler at a concentration of about 0.005 to 1.0% by weight and preferably about 0.01 to about 0.1% by weight. In reacting the acid reactable inorganic mineral filler with the carboxylic acid, the acid is dissolved in an organic solvent for the acid such as $CCl_4$ or an alcohol such as methanol, ethanol, n-propanol, isopropanol and the solution is applied to the filler. The treated filler is agitated for a time sufficient, e.g., 5 to 30 minutes, to permit the surface reaction between filler and acid to occur.

After the acid reaction with the filler is completed, the vinyl ester of the acid is applied to the acid reacted filler at a concentration of about 0.005 to about 1.0% by weight and preferably about 0.01 to about 0.1% by weight together with about 0.1 to 10 parts per million (ppm) based on the weight of the filler of a free radical catalyst which will initiate polymerization of the vinyl ester. Examples of free radical catalysts include peroxide catalysts such as t-butyl perbenzoate, benzoyl peroxide, dicumyl peroxide, methylethylketone peroxide and di-t-butyl peroxide. The temperature of the vinyl ester treated filler is raised to about 70°–100° C. to promote the polymerization of the vinyl ester. Polymerizing the vinyl ester at temperature of 75°–85° C. for 5 to 30 minutes to generally sufficient to prepare an ester coated filler exhibiting improved compatibilization with polyolefin resins.

The acid-ester coated filler compositions of the present invention can be blended with one or more polyolefins by conventional blending techniques such as by mechanically working a mixture of the polyolefin and the coated filler particles by milling or extruding at 100°–180° C. to produce a substantially homogeneous composition.

In manufacturing containers from mixtures of the coated filler of the present invention and polyolefin resins it is preferred that the containers be compression molded from a billet prepared from a mixture of the coated mineral filler and the polyolefin resin.

In preparing the billet, the mixture of components includes about 35 to about 60% by weight of the polyolefin resin and about 40 to about 65% by weight of the coated filler.

The billet can be any shape such as circular, square or polygonal. The billet can be fabricated by preparing a homogeneous mixture of the polyolefin resin and coated filler in an amount sufficient to prepare the container. The mixture of the polyolefin resin and coated carbonate filler particles is compacted at elevated pressures, e.g., 6,000 to 30,000 pounds per square inch (psi) to the desired shape of the billet. Thereafter, the compacted mixture is heated to an elevated temperature near the melt temperature of the resin for a time sufficient to fuse the resin particles. The so-prepared billet is then ready for molding or forging into a container by any conventional compression molding process.

A method preferred for molding the container is disclosed in U.S. Pat. No. 3,923,190 wherein a billet heated to about the melting point of the polyolefin resin is compressed between a pair of opposed die members having different dimensions and adapted to advance through a molding chamber, the first die member being spaced apart from the interior walls of the molding chamber and defining a mold cavity therebetween, the second die member being arranged to move telescopically with respect to the interior walls of the chamber. The die members are heated in the range of 150°–400° F. to accelerate resin flow into the mold cavity. The billet, as it is advanced through the molding chamber, is compressed with sufficient force to cause the billet material to flow radially outward from between the die members and extrude into and fill the mold cavity to form the container.

The invention is illustrated by the following Example.

EXAMPLE

An acid reactable inorganic mineral filler coated in accordance with the present invention was prepared by placing 4000 grams of $CaCO_3$ particles having a median particle size of 3.3 microns in a Welex mixer. To the mixer was added, (during mixing at 100 rpm) 0.36 grams stearic acid dissolved in 50 mls. $CCl_4$. Mixing was continued for about 15 minutes at 600–1600 rpm to permit the stearic acid to react with the $CaCO_3$ particles. Thereafter, 0.396 grams of vinyl stearate dissolved in 35 mls. $CCl_4$ and containing approximately 3 milligram of benzoyl peroxide was added to the mixer spinning at 1000 rpm. The temperature of the mixer was raised to about 80° C. until substantially all of the $CCl_4$ evaporated. The remaining solid product was dried in an air oven at 120° C. and then reground to a powder.

A mixture suitable for forming into billets was formed from 10.4 grams polyethylene powder having a density of 0.95 g/cc and a median particle diameter of 25 microns, 10.4 grams of stearic acid-vinyl stearate modified $CaCO_3$ particles prepared in accordance with the procedure above and 0.03 gram Irganox 1010, a hindered phenol type anti-oxidant. The powder mixture was compacted at 28,000 psi into 2 inch diameter discs having a thickness of 300 mils. The discs were placed in a heating device and heated at 360° F. for 6–8 minutes under ambient pressure conditions. At the end of the heating period, the discs were placed in a compression molding apparatus of the type described in U.S. Pat. No. 3,923,190. The heated disc was placed between the pair of opposed die members of the apparatus, the upper die member being heated to 380° F. and the lower die member being heated to 170° F. The disc was compressed under a force of up to 30 tons with a mechanical press which radially extruded the disc material into the molding cavity of the apparatus to form the sidewalls of the container as the die members descended in the molding chamber.

Two seconds after placement of a heated disc in the molding apparatus, an integral cylindrical hollow container having a capacity of 10 ounces, an average sidewall thickness of 28 mils and a bottom wall thickness of 35 mils was ejected from the molding chamber.

The impact resistance of the container was determined by filling the container with water, sealing the container, and then dropping the container from various heights onto a concrete floor. The container survived successive drops in one foot increments to a height of 4 feet without failure, i.e., the container did not crack or break open.

The physical properties of the container were determined and are summarized in Table I below.

TABLE I

| Direction | Tensile Strength (psi) | Elongation (%) | Energy | AE/HE |
|---|---|---|---|---|
| Axial | 3700 | 20 | 510 | 1.13 |
| Hoop | 2000 | 33 | 450 | |

The values of tensile strength, elongation were determined by the method described in ASTM D 638-72, entitled "Tensile Properties of Plastics".

Direction is the orientation of the tensile sample specimen relative to the cylindrical axis of the container.

Energy is a measure of toughness and is determined as the area under the stress/strain curve. The higher the energy, the better is the toughness.

AE/HE is the ratio of the axial energy to the hoop energy. The lower the ratio, the better is the expected impact resistance of the container.

By way of contrast, the procedure of the Example was repeated with the exception that the stearic acid reacted $CaCO_3$ was not coated with polymerized vinyl stearate. Containers compression molded from the billets formed from mixtures containing equal weight amounts of the stearic acid reacted $CaCO_3$ and the polyethylene could survive only a 2 foot drop. The physical properties of the comparative containers are summarized in Table II below.

TABLE II

| Direction | Tensile Strength (psi) | Elongation (%) | Energy | AE/HE |
|---|---|---|---|---|
| Axial | 3465 | 19 | 470 | 3.13 |
| Hoop | 2200 | 10 | 150 | |

By way of further contrast, the procedure of the Example was repeated with the exception that unmodified $CaCO_3$ was used as the filler. Containers compression molded from billets prepared from mixtures containing equal weight amounts of unmodified $CaCO_3$ and polyethylene could survive only a 2 foot drop. These comparative containers had the following physical properties:

TABLE III

| Direction | Tensile Strength (psi) | Elongation (%) | Energy | AE/HE |
|---|---|---|---|---|
| Axial | 3370 | 18 | 420 | 3.36 |
| Hoop | 2270 | 9 | 125 | |

By preferring to the data recorded in Tables I, II and III above, it is immediately apparant that containers molded from filled polyethylene resins prepared in accordance with the present invention (Table I) have substantially improved impact resistance when compared with containers molded from filled polyethylene resins prepared outside the scope of the present invention (Tables II and III).

What is claimed is:

1. A food container formed from a polyolefin having intimately incorporated therein a coated filler prepared by the sequential steps of reacting an inorganic, acid reactable mineral filler with a long chain carboxylic acid having 8 to 22 carbon atoms to form an acid reacted filler surface, contacting the acid reacted filler with a vinyl ester of a long chain carboxylic acid having 8 to 22 carbon atoms and then polymerizing the vinyl ester to encapsulate the acid reacted filler with a polymerized coating of the vinyl ester.

2. The container of claim 1 wherein the filler is a carbonate salt of a metal of Group 2 of the Periodic Table of Elements.

3. The container of claim 1 wherein the carbonate salt is $CaCO_3$.

4. The container of claim 1 wherein the carboxylic acid is stearic acid.

5. The container of claim 1 wherein the vinyl ester is vinyl stearate.

6. The container of claim 1 wherein the polyolefin is polyethylene.

* * * * *